Oct. 21, 1958 J. J. JAKOSKY 2,857,567
SEISMIC PROSPECTING SYSTEM
Filed Sept. 25, 1950 2 Sheets-Sheet 1

JOHN J. JAKOSKY,
INVENTOR.

HUEBNER, BEEHLER, WORREL & HERZIG,
BY

Warren T. Jessup
ATTORNEYS.

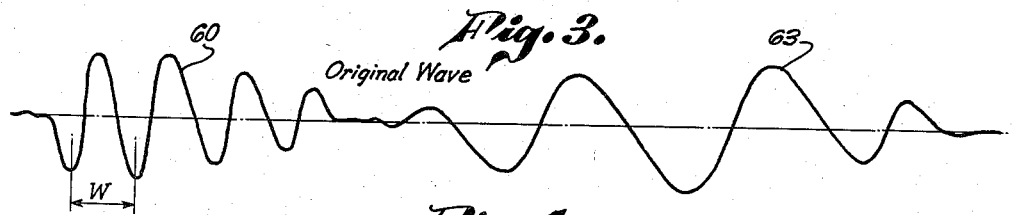
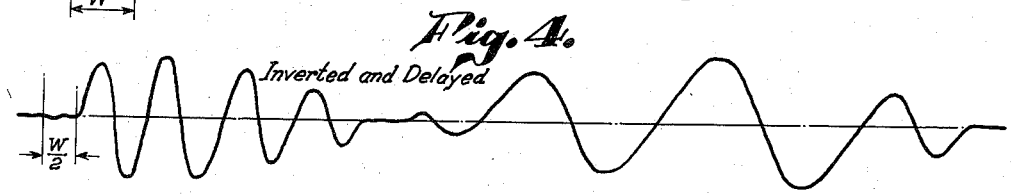
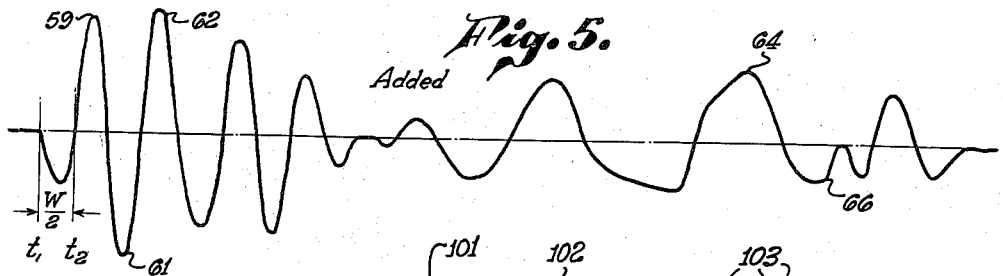
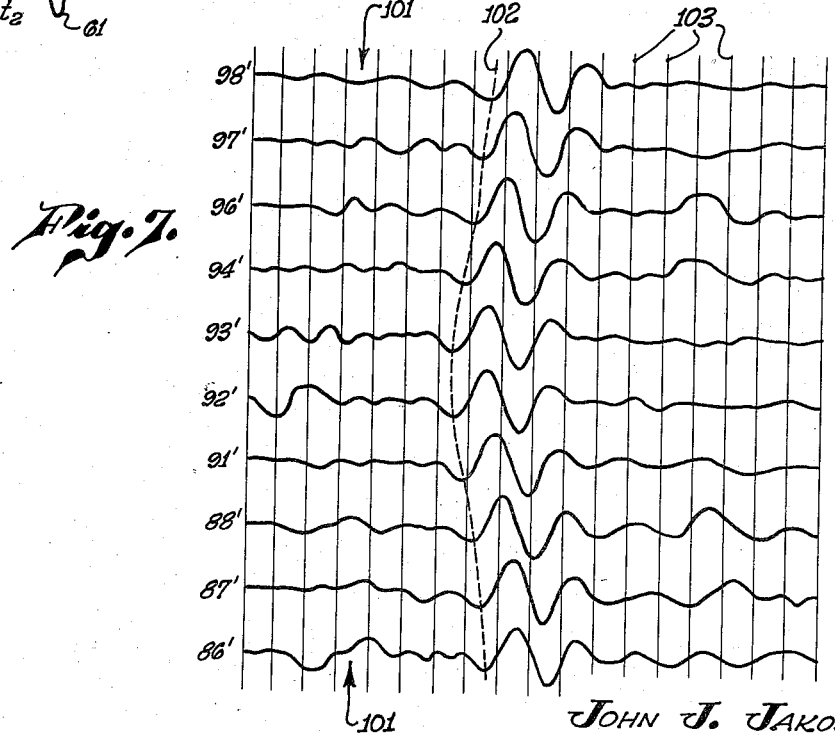

United States Patent Office 2,857,567
Patented Oct. 21, 1958

2,857,567
SEISMIC PROSPECTING SYSTEM

John J. Jakosky, West Los Angeles, Calif., assignor to International Geophysics, Inc.

Application September 25, 1950, Serial No. 186,520

15 Claims. (Cl. 324—77)

This invention relates to seismic prospecting systems, especially to frequency discriminating spectrum analyzers used therein, and has particular reference to the analysis of echo phenomena recorded on a tape or film as a result of seismic soundings, taken generally in oil exploration. The features of this invention may be employed with the apparatus and method of my copending application, Serial No. 60,775, filed November 18, 1948 now abandoned, for Seismic Prospecting System, to which reference is made for a background understanding. It is to be understood, however, that the teachings of the instant invention may be equally employed in other environments.

In the analysis of stored, recorded phenomena, it is often desirable to pick out those portions which are a particularly strong amplitude of a predetermined frequency. As described in the above mentioned copending application, in analyzing such recorded phenomena, it may be translated into an energy signal by means of a suitable pick-off or scanning device, and then the energy is passed through a selective filter which rejects all signals except those of a predetermined frequency or narrow frequency band. The component thus processed through the filter is then re-recorded, generally visually on a tape, and the resulting record is analyzed visually to pick out those portions of the phenomenon which are particularly strong in oscillations of the given frequency.

The customary filter, in passing a signal energy, requires a certain amount of time to build its response, so that the output signal from the filter tends to lag the input by a small time, generally in the order of magnitude of one cycle. The exact lag time is a funtcion of the characteristics of the filter, the frequency, and the amplitude of the frequency component passed by the filter. This lag does not become particularly objectionable except in those instances where it is essential to know very precisely the exact time in the phenomenon when the particular response of the given frequency began. Such a requirement of high precision is found in seismic recording, where the time sacle on the phenomenon record must be translated into distance. As a practical example, an error of one cycle, of a thirty cycle wave in a region of 10,000 feet per second effective velocity would be equivalent to an error of approximately 166 feet in determining the depth from which the particular frequency response came. Such an error is intolerable for practical determination of an oil structure, and might result in misinterpreting the structure entirely.

It is accordingly an object of this invention to provide frequency discriminating spectrum analyzing apparatus in which a particular frequency or wave length may be accentuated to the detriment of other frequencies and which has a build-up time of one-half cycle.

It is a further object of this invention to provide such apparatus which has a precisely known build-up time (in this case one-half cycle) so that the exact time where the given frequency response began can be precisely determined.

It is a further object of this invention to provide means for reproducing a recorded phenomenon which will give the desired frequency discrimination while obviating the disadvantages of conventional filters.

Not only do the conventional filters have a variable build-up time, or lag, but if the filter is of the sharp tuning type desired in apparatus of this nature it tends to store energy for a predetermined time after receipt thereof; that is, it tends to "ring," so that the output response generally dies out much more slowly than the actual input received, thereby giving a false indication of the actual time duration of the preselected frequency component in the recorded phenomenon. It is, accordingly, an object of this invention to provide frequency discriminating means which does not "ring," or persist, for an undue length of time after disappearance of the actual signal at its input. In the instant invention, the persistence time is the same as the build-up time namely, one-half cycle.

It is another object of this invention to provide a means and method of discriminating in favor of a wave train of desired wave length, and for suppressing wave trains and random pulses of energy at other frequencies.

It is a further object of this invention to provide an apparatus of the nature under discussion having means for accentuating the wave train of predesired frequency, which minimizes the build-up time normally encountered with conventional filters, and which is free of undue trail-oscillations normally attendant upon the use of conventional filters.

It is a still further object of this invention to provide apparatus for spectrum analysis of a wave phenomenon, which is simple in its construction and operation.

A preferred form of the instant invention will now be described with reference to the drawings wherein:

Figs. 3, 4 and 5 are wave forms useful in illustrating operation of the instant invention;

Fig. 7 is a graph showing linear oscilloscope traces derived in practice of the instant invention.

Figure 1:
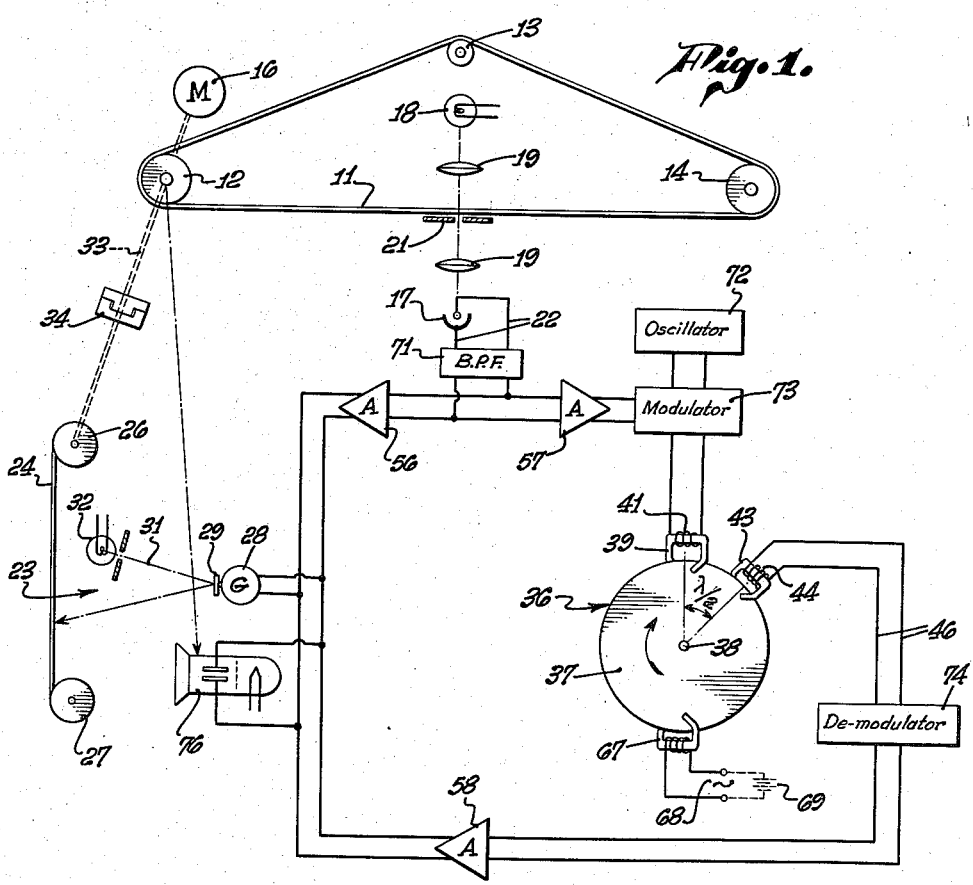
Fig. 1 is a schematic and circuit diagram illustrating the instant apparatus.

Referring to the figures, there is shown a phenomenon storage means in the form of a tape 11, preferably although not necessarily, made into a continuous loop. The tape 11 rides around three spaced rollers 12, 13, and 14, the first mentioned being of sprocket type and driven by a constant speed motor 16 which causes the tape 11 to move longitudinally and continuously around the rollers. Tape 11 has longitudinally recorded thereon a phenomenon, such as the response to a seismic explosion of the type used in oil exploration.

The wave phenomenon recorded on the tape 11 is scanned and translated into an energy signal by a suitable pick off or scanning means, in this case a photoelectric means 17 which receives varying amounts of light. Light from a light source 18 passes through a lens system 19 and a slit 21 immediately adjacent the moving tape 11. In this way, the photographically recorded phenomenon stored on the tape 11 is translated into an energy signal in the form of an electric signal appearing on the leads 22.

A recording means 23 is electrically connected, as shown, to the photo-electric means 17 to visibly re-record the phenomenon on a photo-sensitive tape 24 driven by a take-up drum 26 from a feed drum 27. The wave phenomenon is recorded on the tape 24 by a galvanometer 28 which actuates an attached mirror 29 to deflect a beam of light 31 from a light source 32 in accordance with the energy signal received from the photoelectric means 17. The take-up drum 26 is preferably driven in synchronism with the driving sprocket 12 of the tape 11 through a shaft shown schematically at 33. A clutch is interposed between the sprocket 12 and the drum 26 for a purpose to be described hereinafter.

Thus far the apparatus described serves simply to translate a wave phenomenon recorded on the tape 11 into an electric energy signal, appearing on the leads 22, and to record the phenomenon in the form of a visible oscillographic type wave on the photographic tape 24.

In accordance with the instant invention there is provided another recording means 36 including principally a storage means in the form of a disk 37 rotatable about an axis 38; and a phenomenon applying means in the form of a paramagnetic, horseshoe-shaped core 39, energized by a coil 41, connected to the photo-electric means 17. Through the apparatus 36, the phenomenon stored on the tape 11, after translation into an energy signal on the leads 22, is recorded or stored on the magnetic disk 37, in the form of varying magnetism at the periphery of the disk 37, applied through the core 39 and coil 41.

As will be described later, a multiplicity of disks may be mounted on the same shaft 38, to allow the simultaneous recording of phenomena from a number of channels recorded originally on tape 11.

The disk 37 is rotated clockwise (Fig. 1) by a motor 42 (Fig. 2) preferably driven at constant speed. It is preferred in accordance with the instant invention that the speed of the motor 42 be such that the peripheral speed of the disk 37, where it passes through the arms of the core 39, is several times greater than the speed of the tape 11 passing the slit 21. In this manner the physical spacing between corresponding portions of the recorded phenomenon is several times greater on the periphery of the disk 37 than on the tape 11. The purpose of this increased spacing, will be explained hereinafter.

Mounted to the leeward of the core 39—i. e., in position to be passed by a given portion of the disk 37 shortly after that portion passes the disk 39—is a pick off or scanning means in the form of a core 43 which, like the core 39, is of horseshoe-shape and brackets the periphery of the disk 37. About the core 43 is wound a coil 44 in which is induced an electric signal corresponding to the phenomenon stored magnetically on the disk 37. The phenomenon is thus re-translated into an electric signal appearing on the leads 46.

Since the core 43 is positioned to the leeward of the core 39, it follows that the energy signal appearing on the leads 46 will be substantially identical to that appearing on the leads 22 except that it will lag in phase by a time corresponding to the peripheral distance between the core 39 and the core 44; this distance being related to time by the peripheral speed of the disk 37. In use of the instant invention it is desired that the spacing between the cores 44 and 39 be equal to one-half wave length of the particular frequency which is to be studied in the phenomenon recorded on the tape 11. In order that the operator may discriminate in favor of different frequencies in a continuously variable manner, the core 44 is made accurately adjustable with respect to the core 39 by being mounted on the end of a radial arm 47 (Figure 2) secured to a rotatable shaft 48 which is coaxial with the axis 38 of the disk 37 and motor 42. The shaft 48 to which the arm 47 is secured is journalled in a standard 49 secured to the base 51, which also mounts the motor 42. The standard 49 may be provided with index marks on its face 52 opposite which registers a pointer 53 secured to the shaft 48, rotatable by a manually operable knob 54. In this way, for a given speed of the motor 42, the face 52 may be calibrated in terms of frequency or wave-length under observation.

As seen in Fig. 1, output from the pick off core 43 is, like the output from the photo-electric means 17, applied to the recording means 23, specifically to the galvanometer 28.

In order to prevent the delayed signals, appearing on the leads 46 and applied to the galvanometer 28, from feeding back to the leads 22 and then again to the recording means 36 so that re-generation would occur, unidirectional signal translating means 56 are interposed in the connection between the galvanometer 28 and the photo-electric means 17. This means preferably assumes the form of an amplifier which in addition to blocking feed-back, also serves the useful function of amplifying the energy signal appearing on the leads 22. Other amplifiers may be also employed in the circuit, for example the amplifier 57 interposed between the photo-electric means 17 and the recording means 36, and the amplifier 58 interposed between the pick off core 43 and the galvanometer 28.

These amplifiers fulfill, in their aggregate effect, another function in the instant invention—namely, the function of inverting the signal applied from the core 43 to the galvanometer 28 with respect to the signal applied directly from the photo-electric means 17. The number of phase inverting stages in the amplifier 56 in one of the paths as compared to the total number of phase inverting stages in the two amplifiers 57 and 58 in the other path is such that the two signals applied to the galvanometer 28 are inverted with respect to each other. Thus, the effect of the circuit of Fig. 1, as will be pointed out more particularly in conjunction with the explanation of Figs. 3, 4, and 5, is to apply to the galvanometer 28, the sum of two signals—one, the original signal; the other, the same signal delayed by one-half wave length (at a given frequency), and inverted. The inversion also may be accomplished without amplifiers simply by correct attachment of the leads 46 to the galvanometer 28.

The manner in which this delayed and inverted summation assists in discriminating in favor of a predetermined frequency contained in the phenomenon wave recorded on tape 11 will now be explained with particular reference to Figs. 3, 4, and 5.

Referring to Fig. 3, there is shown a wave phenomenon plotted in terms of excursion vs. time. With certain types of seismic equipment, the Fig. 3 diagram corresponds to just what would be visibly recorded on the tape 11. With other types of equipment, the oscillations might appear as alternating light and dark portions of the tape, in the form of a variable area or a variable density recording. Still another type of equipment uses magnetic or contour variations in the storage means to record the wave phenomenon.

Referring to Fig. 3, a portion of an actual wave train is shown in oscillographic form as recorded on the tape 11. Let it be supposed that the operator of the equipment illustrated in Fig. 1 desires to pick out those portions of the recorded phenomenon 60 which are particularly strong in amplitude corresponding to a wave length W. By means of the knob 54 he adjusts the arm 47 until the core 43 is picking off the signal just one-half wave length $$\frac{W}{2}$$

later than it is being applied to the disk 37 by the phenomenon applying core 39.

Fig. 3 in addition to representing the trace on the tape 11, is also a time representation of the electric signal on the leads 22. Under the conditions defined above, the trace shown in Fig. 4 is thus a representation of the signal picked off the disk 37 by the core 43 with its winding 44. It will be noted that the signal of Fig. 4 lags that of Fig. 3 by exactly one-half wave length $$\frac{W}{2}$$

It will be also noted that the Fig. 4 trace is inverted with respect to the Fig. 3 trace, that is to say, the polarity at any point has been reversed in sign. Thus, Fig. 3 is a representation of the energy signal applied to the galvanometer 28 directly from the photo-electric means 17, while Fig. 4 is a representation of the signal applied to the galvanometer 28 from the pick off means 43. The galvanometer then responds to the algebraic sum of the two signals shows respectively in Figs. 3 and 4. This sum has been plotted in Fig. 5 and indicates the resultant record which the galvanometer 28 traces through the light beam 31 on the tape 24.

A study of Fig. 5 shows that those portions of the original wave (Fig. 3) which are particularly strong in oscillations of wave length W are in effect amplified, so that their maximum amplitudes are practically doubled. This is shown for example in the amplitude peaks 59, 61, and 62. Other portions of the original phenomenon which are originally of the same amplitude—for example the long wave length component shown at 63, are not amplified; for example, see the relatively low peak 64 in Fig. 5. Not only is selective amplification accorded to the proper waves by this method, but in addition the selected waves come through on the tape 24 in clean, clearly definable configuration.

Thus, an analyst studying the Fig. 5 wave appearing on the tape 24 is quickly able to select the wave 59, and to a certain extent the lesser trailing waves, as being the desired wave length W.

Furthermore, the skilled analyst, recognizing that the first accentuated peak 59 starts at time $t_2$ will, by simply subtracting one-half wave length therefrom be able to define with precision that the original wave actually started at $t_1$, as shown in Fig. 5. That this is true is confirmed in this example by reference to Fig. 3 showing that the wave actually started at $t_1$.

It is desirable to incorporate certain refining elements in the apparatus of Fig. 1, notably an erasing means in the form of a core 67 positioned to the leeward of the pick-off core 43, and energized by a high frequency A. C. source 68, which serves in conventional fashion to erase all signals from the periphery of the disk 37. The disk periphery thus approaches the phenomenon applying core 39 in neutral or clean fashion, ready to accept the new signal. If desired, a D. C. erasing means as shown at 69 may be used instead of the A. C. means 68.

It may also be desirable to eliminate, by means of a conventional wide band pass filter 71, all frequencies except those in the general range in which the analyst is interested. This filter is preferably incorporated into the amplifiers 57 or 58 employing circuits well known to the seismic prospecting art.

In typical seismic analyses, the frequency spectrum in which the analyst is interested ranges from approximately 15 to 150 cycles. These frequencies are somewhat difficult to handle by a magnetic storage means as shown at 36. Therefore, if desired, a carrier frequency may be injected into the system by means of an oscillator 72, this carrier being modulated in the modulator 73 by the energy signal (Fig. 3) from the photo-electric pick off means 17. The modulated carrier is then picked up by the pick off core 43 and de-modulated at 74 before recombination with the original signal in the galvanometer 28.

While it is theoretically possible to take both signals to be mixed from the tape 11 at two points spaced by one-half wave length, the practical difficulty arises in connection with physical dimensions of the pick-off apparatus required. Unless the tape 11 is run at a very high speed—which would not only require very strong tape, but would also necessitate a very long length of tape to record a given phenomenon—the physical spacing on the tape 11 corresponding to a half wave length of, for example, a 60-cycle wave would be so small that it would be virtually impossible to position two known types of photo-electric or other pick-off devices close enough together to get them just one-half wave length apart.

Figure 2:
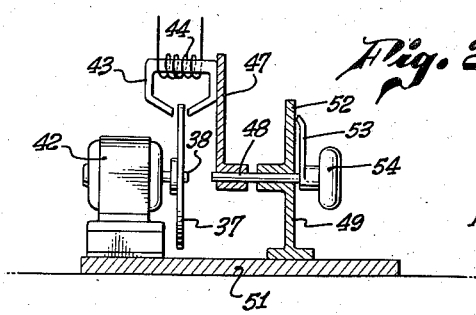
Fig. 2 is a sectional elevation illustrating a portion of the apparatus of Fig. 1.

In accordance with the instant invention, by re-recording the phenomenon on disk 37, which may be driven at a peripheral speed perhaps 10 times that of the linear speed of the tape 11, it is possible to lengthen the physical spacing corresponding to one-half wave length to a distance on the disk 37 ten times that of the same phenomena appearing on the tape 11. This expedient allows ample room for the adjustable mounting of the core 43 with respect to the core 39 as shown in Fig. 2. Thus, in the apparatus illustrated in Figs. 1 and 2, with the core 43 adjusted by means of the arm 47 to its closest position to the core 39, and with the disk 37 operating at a peripheral speed ten times that of the tape 11, the wave length between the cores 43 and 39, correspond to a frequency of several hundred cycles is well above the upper limit of the frequencies in which the analyst is interested.

In actual use, the operator does not rely primarily on the pointer 53 registering against the indexes on the face 52, but obtains his critical adjustment by means of a continuous observation means such as an oscilloscope 76 connected in parallel with the galvanometer 28. The horizontal circuit of the oscilloscope 76 is driven in synchronism with the tape sprocket 12 so that the operator has available to him at all times a trace of the actual signal being applied to the galvanometer 28.

By means of the clutch 34, the recording means 23 is placed in operation only when the operator has selected his frequency by observing the oscilloscope 76. With clutch 34 disengaged, the operator turns the knob 54 until there appears on the oscilloscope 76 a sharply defined frequency response, as for example the excursions 59, 61, and 62 of Fig. 5 at the general depth range of interest. He then engages the clutch 34, for one cycle of the tape 11. This cycle, with its sharply defined frequency response, is thus recorded on the tape 24. The analyst may then adjust the knob 54 until another frequency at some other depth sharply stands out on the oscilloscope 76 whereupon he repeats the clutching and recording procss.

In brief, it will be seen that the instant invention comprises the recording of a wave phenomenon on the tape 11, and the subsequent re-recording of the phenomenon on an intermediate storage disk 37 at a recording speed much greater than that of the original recording, thereby allowing the pick off core 43 to be positioned one-half wave length from the aplying or recording core 39. The output of the pick off core 43 is then added to the original signal, taken directly from the photo-electric means 17, the two signals being inverted with respect to each other, and the second signal being delayed by one-half wave length at the frequency under study. As best seen in Fig. 5, this process not only accentuates the desired frequency, but tends to suppress or phase out random noise and undesired frequency components, as seen at 64 and 66 in Fig. 5. It will be noted that the tuning effected through knob 54 is continuously variable, so that the analyst is not confined in his study to predetermined discrete frequencies, but may tune precisely to any frequency desired within the range of the apparatus.

It will be readily understood that many alternatives and equivalents may be employed within the scope of the teaching contained herein. For example, the recording means 36, while shown as a disk type magnetic recorder, may if desired, be any suitable type of recorder, such as a magnetic wire recorder employing a closed wire loop, or a sound record recorder. Likewise, it will be obvious that the invention may employ any suitable recording means at 11 and 23.

Use of the apparatus described hereinbefore will now be explained in connection with Figures 6 and 7, this use also embodying another aspect of the instant invention.

Figure 6:
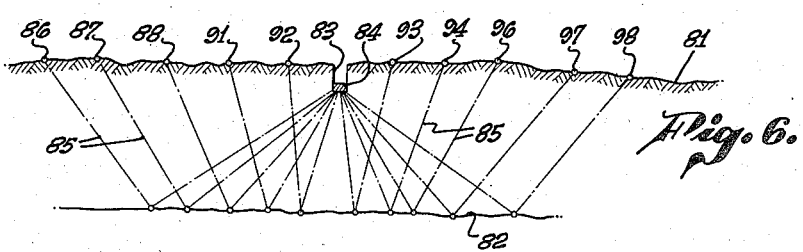
Fig. 6 is an elevational section showing a preferred specific application of the instant invention.

Fig. 6 is an elevational section of earth strata to be seismically explored. The surface of the earth is shown at 81 and a particular reflecting stratum is shown at 82.

The required quantity of explosive is placed in a shallow drill hole 83, and an explosion is effected at 84. Numerals 86, 87, 88, 91, 92, 93, 94, 96, 97, and 98 represent a plurality of seismometers, ten in this example, which receive echoes of the explosion 84 as reflected from the stratum 82. The paths 93 over which the reflections reach their respective seismometers are of different lengths. Any given reflection emanating from the explosion point 84 will reach the receiving point 91, for example, after the corresponding reflection reaches the point 92. The last points to receive any particular reflection will of course be the extreme points 86 and 98.

These vibrations received at the reception points 86–98 may be transmitted to a single recorder where all ten traces are recorded side by side on a single tape, or alternatively each recorder may have its own tape.

For simplicity, the following explanation will assume that separate tape recordings with suitable synchronizing marks are taken for each of the reception points 86–98. Each of these tapes then becomes a tape 11 as shown in Fig. 1 and ten frequency discriminating re-recorders of the type shown in Fig. 1 are employed simultaneously to analyze each of the ten tapes 11. Each of the re-recorders has its own recording means 36 and its own pick off means 43, but it is preferred that the angular adjustment of the several pick off means 43 be ganged so that a single knob 54 (Fig. 2) serves to move each of the pick offs 43 in unison; thus, all ten of the re-recorders, as shown in Fig. 1, will be tuned simultaneously to identical, continuously-variable frequencies.

The ten outputs from the re-recorders are applied to ten different galvanometers 28 which preferably reflect the light beam 31 onto a single re-recording tape 24, with the ten traces being laterally displaced on the tape 24, so that simultaneous recordings from each of the ten reception points 86–98 are placed side by side on a single tape. A representative section of such tape is shown in Fig. 7.

As in the case of the single trace, the operator is given the benefit of an observing means such as the oscilloscope 76 so that he may precisely and carefully tune the knob 54 to obtain a significant line-up of traces. The oscilloscope is of the multi-beam type or else a suitable switching device is employed with a single beam, long persistence oscilloscope so that the desired number of traces may be viewed simultaneously. If all of the traces are not viewed, then those that are viewed should include preferably the two outside traces 86 and 98, and one or more of the intermediate traces.

Referring to Fig. 7 there are shown ten side-by-side linear traces 86'–98' corresponding to the responses received at the correspondingly identified reception points of Fig. 6. These traces have been suitably "filtered" in ten apparatuses of the type shown in Fig. 1 and re-recorded on a single tape 24.

Experimental work has shown that many reflecting strata have a natural response frequency which they favor in reflecting the seismic energy. Let it be assumed that the stratum 82 of Fig. 6 has a natural vibration or reflection frequency of 32.7 cycles per second; that is to say, the random energies from the shock point 84 reaching the stratum 82 will be reflected from the stratum 82 with a predominance in favor of energy at a frequency of 32.7 cycles per second. Let it be assumed further that the ten traces of Fig. 7 were obtained with the ten "filters" of Fig. 1 tuned to 32.7 cycles per second. Random noise and reflections from strata which are responsive to other frequencies reveal no particularly distinctive line-up of responses across the tape of Fig. 7. Such is the condition of the zone marked 101 in which there is no particular line-up of traces. However, following the dotted line 102 laterally across the traces of Fig. 7, it is seen that a significant matching of excursion peaks appears across the tape.

In operation, the analyst tunes the knob 54, controlling the ten ganged pick offs 43, until the traces appearing on the oscilloscope 76 give a significant matching of peaks, as shown, for example, at 102 in Fig. 7. This indicates a true reflection from a significant stratum 82. Knowing the distance between the reception points 86–98, and measuring the difference in arrival time of the significant reflection peaks across the tape of Fig. 7 (determined by the transverse calibration lines 103), the dip of the stratum 82 may be determined as well as its characteristic frequency, in this case 32.7 cycles per second. This latter information may be used later in connection with other seismic point observations to identify the same or similar beds under the surface of the earth.

It will be appreciated that the above use of the herein described apparatus embodies an inventive concept which is not limited even to the intermediate storing of the signal such as is effected in the recording means 36. The concept of continuously varying the frequency of analysis, until the sharpest onset of the desired reflection is obtained, may be practiced even with a conventional filter, in place of the recording means 36 and the mixing with the direct signal through the amplifier 56. That is, in this aspect of the invention, the apparatus 36, 43, 56, 57, 58, 72, 73, 74 may be replaced by a simple adjustable filter interposed between the photo cell 17 and the re-recorder 23 and oscilloscope 76.

In such case the operator simply adjusts the filter, while observing the oscilloscope 76, until the sharpest response or responses is obtained; and then makes the record on the tape 24.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent methods and apparatus.

What is claimed is:

1. Spectrum analyzer comprising in combination: phenomenon storage means having a phenomenon recorded thereon, first pick off means positioned adjacent said storage means effective to translate the recorded phenomenon into an energy signal, first recording means connected to said first pick off means to re-record the phenomenon, second recording means connected to said first pick off means to re-record the phenomenon, second pick off means positioned adjacent said second recording means to re-translate the phenomenon into an energy signal lagging in time phase the signal translated by said first pick off means, and means connecting said second pick off means to said first recording means whereby the latter records simultaneously the algebraic sum of two time-displaced portions of the phenomenon.

2. Apparatus according to claim 1 wherein said second pick off means is adjustably positioned adjacent said second recording means.

3. Apparatus according to claim 1 wherein uni-directional signal translating means is interposed between said first pick off means and said first recording means to isolate these two means and prevent signal feedback.

4. Apparatus according to claim 3 wherein said second recording means is a cyclic recorder and includes erasing means for eliminating phenomena recorded thereon, whereby said recorder may be used and re-used indefinitely.

5. Frequency discriminating apparatus comprising in combination: first phenomenon storage means having a phenomenon recorded thereon, first pick off means positioned adjacent said first storage means, said first storage means and said first pick off means being relatively movable, whereby said first pick off means scans said first storage means to translate the recorded phenomenon into an energy signal, first recording means connected to said first pick off means to re-record the phenomenon, second recording means including second storage means and phenomenon applying means connected to said first pick off means to re-record the phenomenon on said second storage means, said second storage means and said applying means being relatively movable and said applying means being connected to said first pick off means, whereby said applying means scans said second storage means to re-record the phenomenon thereon, the relative scanning speed between said second storage means and said applying means being several times greater than the relative scanning speed between said first pick off means and said first storage means, second pick off means positioned adjacent said second storage means, spaced from said applying means a distance corresponding to one-half wave length at the desired frequency to be analyzed in the recorded phenomenon, and effective to translate the phenomenon into an energy signal lagging the signal translated by said first pick off means by one-half wave length, means for inverting one of said signals with respect to the other of said signals, and means connecting said second pick off means to said first recording means, whereby the latter records simultaneously the algebraic sum of a portion of said phenomenon and another portion lagging one-half wave length and inverted.

6. Spectrum analyzer comprising in combination: first phenomenon storage means having a phenomenon recorded thereon, first pick off means positioned adjacent said first storage means effective to translate the recorded phenomenon into an energy signal, said first storage means being cyclic, or continuous, and being movably mounted with respect to said first pick off means, so that upon relative movement between said first storage means and said first pick off means said first pick off means picks off the phenomenon recorded on the storage means repetitively, or cyclically; first recording means including storage means and applying means, the latter being connected to said first pick off means to re-record the phenomenon on the storage means of said first recording means; second recording means including storage means and applying means, the latter being connected to said first pick off means to re-record the phenomenon on the storage means of said second recording means, the storage means and the applying means of said second recording means being relatively movable repetitively, or cyclically, so that the applying means cyclically scans the storage means of said second recording means, the relative speed between the storage means and the applying means of said second recording means being several times greater than that between said first storage means and said first pick off means, whereby the physical spacing between given time increments of the recorded phenomenon is several times greater on the storage means of said second recording means than on said first storage means; second pick off means adjustably mounted with respect to the applying means of said first recording means and adjacent the storage means of said second recording means, effective to re-translate the phenomenon into an energy signal lagging in time phase the signal translated by said first pick off means; and means connecting said second pick off means to said first recording means, whereby the latter records simultaneously the algebraic sum of two time-displaced portions of the phenomenon.

7. Apparatus according to claim 6, including unidirectional signal translating means interposed in the connection between said first pick off means and said first recording means, thereby to isolate these two means and prevent energy feed-back from said first recording means to said first pick off means.

8. Apparatus according to claim 6, including erasing means positioned adjacent the storage means of said second recording means to erase the phenomenon stored thereon after it has been picked off by said second pick off means.

9. Spectrum analyzer comprising in combination: a tape having a phenomenon recorded longitudinally thereon; photo-electric pick off means positioned adjacent said tape and effective to translate the phenomenon recorded on the tape into an energy signal; means mounting said tape for longitudinal movement past said photo-electric means whereby said photo-electric means is caused to scan said tape, first recording means connected electrically to said photo-electric means effective to visibly re-record said phenomenon in response to the signal translated by said photo-electric means; second recording means including a rotatable recording disk and phenomenon applying means positioned adjacent said disk, said applying means being connected electrically to said photo-electric means to apply the signal to said disk thereby to re-record the phenomenon on said disk; pick off means positioned adjacent said disk and effective to translate the phenomenon stored on said disk into an energy signal, the speed of said disk past said applying means and said pick off means being several times greater than the speed of said tape past said photo-electric means, whereby the physical spacing between corresponding portions of said phenomenon is several times greater on said disk than on said tape; and means connecting said pick off means to said first recording means whereby the latter records simultaneously the algebraic sum of two time-displaced portions of the phenomenon.

10. Apparatus according to claim 9 including an erasing means positioned adjacent said rotatable disk and effective to erase the phenomenon stored thereon.

11. Apparatus according to claim 10 including unidirectional signal translating means interposed between said photo-electric means and said first recording means thereby to prevent signal feed back from said first recording means to said photo-electric means.

12. Apparatus according to claim 10, wherein said tape is formed in a continuous loop so that the phenomenon may be repetitively scanned by said photo-electric means, and including observation means connected in parallel with said first recording means so that an operator may continuously observe the resultant signal being applied to said first recording means.

13. Spectrum analyzer comprising in combination: a longitudinally movable tape having a phenomenon longitudinally recorded thereon; first scanning means positioned in scanning relation to said tape to translate the phenomenon recorded thereon into an electric signal; first recording means electrically connected to said first scanning means effective to re-record the phenomenon translated by said first scanning means; second recording means including a rotatably mounted para-magnetic disk, signal applying means disposed adjacent the periphery of said disk, second scanning means disposed at the periphery of said disk displaced to the leeward of said signal applying means a distance corresponding to one-half wave-length at the frequency to be analyzed in the recorded phenomenon and effective to re-translate the phenomenon into an electric signal, and erasing means disposed at the periphery of the disk to the leeward of said second scanning means effective to erase phenomena stored on said disk; means electrically connecting said first scanning means to said signal applying means whereby said phenomenon is re-recorded on said disk; means for inverting one of said signals with respect to the other of said signals; and means electrically connecting said second scanning means to said first recording means whereby the latter records simultaneously the algebraic sum of a portion of the phenomenon and another portion lagging by one-half wave length and inverted.

14. Apparatus according to claim 13 including unidirectional signal translating means interposed between said first recording means and said first scanning means to prevent signal feed back from said first recording means to said first scanning means.

15. Apparatus according to claim 13 wherein said tape is in a continuous loop, and wherein the apparatus includes also an observing means connected in parallel with said first recording means, whereby the operator may continuously observe the resultant signal applied to said first recording means.

References Cited in the file of this patent

UNITED STATES PATENTS

| | | |
|---|---|---|
| 2,137,032 | Snow | Nov. 15, 1938 |
| 2,226,459 | Bingley | Dec. 24, 1940 |
| 2,243,729 | Ellis | May 27, 1941 |
| 2,243,730 | Ellis | May 27, 1941 |
| 2,304,740 | Minton | Dec. 8, 1942 |
| 2,354,176 | Goldsmith | July 18, 1944 |
| 2,394,990 | Eisler et al. | Feb. 19, 1946 |
| 2,427,421 | Rieber | Sept. 16, 1947 |
| 2,493,534 | Hawkins | Jan. 3, 1950 |
| 2,594,767 | Green | Apr. 29, 1952 |
| 2,604,955 | Hawkins | July 29, 1952 |